US012691627B2

(12) United States Patent
Pedmo et al.

(10) Patent No.: US 12,691,627 B2
(45) Date of Patent: Jul. 28, 2026

(54) PLASTIC CONTAINER WITH INTERNAL LINER AND METHOD OF FORMING PLASTIC CONTAINER

(71) Applicant: Plastipak Packaging, Inc., Plymouth, MI (US)

(72) Inventors: Marc A. Pedmo, Litchfield, OH (US); Andrew Fischer, Valley City, OH (US)

(73) Assignee: Plastipak Packaging, Inc., Plymouth, MI (US)

( * ) Notice: Subject to any disclaimer, the term of this patent is extended or adjusted under 35 U.S.C. 154(b) by 0 days.

(21) Appl. No.: 18/534,125

(22) Filed: Dec. 8, 2023

(65) Prior Publication Data

US 2024/0190061 A1      Jun. 13, 2024

Related U.S. Application Data

(60) Provisional application No. 63/431,113, filed on Dec. 8, 2022.

(51) Int. Cl.
| | |
|---|---|
| *B29C 49/24* | (2006.01) |
| *B29C 49/22* | (2006.01) |
| *B29C 49/68* | (2006.01) |
| *B65D 1/02* | (2006.01) |
| *B65D 23/02* | (2006.01) |
| *B65D 65/38* | (2006.01) |
| *B29K 67/00* | (2006.01) |
| *B29K 105/26* | (2006.01) |
| *B29L 31/00* | (2006.01) |

(52) U.S. Cl.
CPC ............ *B29C 49/251* (2022.05); *B29C 49/22* (2013.01); *B29C 49/68* (2013.01); *B65D 1/0215* (2013.01); *B65D 23/02* (2013.01); *B65D 65/38* (2013.01); *B29C 2049/2404* (2013.01); *B29C 2949/0715* (2022.05); *B29K 2067/003* (2013.01); *B29K 2105/26* (2013.01); *B29L 2031/7158* (2013.01); *B65D 2565/384* (2013.01)

(58) Field of Classification Search
CPC ........ B29C 2049/2404; B29C 49/2408; B29C 49/24; B29C 49/251
See application file for complete search history.

(56) References Cited

U.S. PATENT DOCUMENTS

| | | | |
|---|---|---|---|
| 3,113,831 A | 12/1963 | Coale | |
| 3,426,940 A * | 2/1969 | Broerman | B29C 49/24 |
| | | | 220/644 |
| 3,450,254 A * | 6/1969 | Gilbert | B65D 23/02 |
| | | | 29/523 |
| 4,696,840 A | 9/1987 | Mccullough | |

(Continued)

FOREIGN PATENT DOCUMENTS

| | | |
|---|---|---|
| WO | 1991008100 A1 | 6/1991 |
| WO | 2013192260 A1 | 12/2013 |
| WO | 2018167193 A1 | 9/2018 |

OTHER PUBLICATIONS

International Search Report, PCT/US2023/083157, dated Feb. 22, 2024.

*Primary Examiner* — Benjamin A Schiffman
(74) *Attorney, Agent, or Firm* — Reising Ethington P.C.

(57) ABSTRACT

A plastic container assembly includes an outer container and an inner liner or bag, wherein the inner liner or bag is expanded within the outer container. Processes for making a plastic container with an inner liner are also disclosed.

12 Claims, 6 Drawing Sheets

(56)                    References Cited

U.S. PATENT DOCUMENTS

| | | | | |
|---|---|---|---|---|
| 4,984,713 | A | 1/1991 | Chambers | |
| 5,569,473 | A | 10/1996 | Bright | |
| 5,704,503 | A | 1/1998 | Krishnakumar | |
| 5,968,616 | A | 10/1999 | Kakemura | |
| 10,507,954 | B2 * | 12/2019 | Lee | B29C 49/251 |
| 10,995,909 | B2 * | 5/2021 | Imai | B29C 69/007 |
| 11,571,836 | B2 * | 2/2023 | Landman | B65D 23/02 |
| 2021/0130030 | A1 * | 5/2021 | Vierboom | B29C 49/071 |
| 2021/0146390 | A1 | 5/2021 | Gleixner | |

* cited by examiner

10

20

A

10

30

A

20

10

30

PLASTIC CONTAINER WITH INTERNAL LINER AND METHOD OF FORMING PLASTIC CONTAINER

CROSS-REFERENCE TO RELATED APPLICATIONS

This application claims the benefit of U.S. Provisional Application No. 63/431,113, filed Dec. 8, 2022, which is incorporated by reference herein in its entirety.

TECHNICAL FIELD

The present disclosure generally relates to plastic containers that include an inner liner, including plastic containers with a blown internal liner, and methods for making the same.

BACKGROUND

There is a desire to develop new or improved methods for creating plastic containers or bottles that have an internal liner or bag within such plastic containers or bottles. With some conventional plastic containers or bottles, a liner is assembled with a preform, and the combination of liner and preform is blow molded together to form a plastic container or bottle having an internal liner.

However, it is desirable to provide other methods and resulting articles that reduce or avoid some challenges associated with known plastic containers formed from the blow molding of assembled liners and preforms.

SUMMARY

A plastic container assembly includes an outer container and an inner liner or bag. In embodiments, the inner liner or bag is expanded within the outer container. Processes for making a plastic container with an inner liner are also disclosed.

BRIEF DESCRIPTION OF THE DRAWINGS

Embodiments of the disclosure will now be described, by way of example, with reference to the accompanying drawings, wherein.

DETAILED DESCRIPTION

Embodiments of the present disclosure can involve, inter alia, plastic containers, including plastic aerosol type bottles, that have an internal liner. Such embodiments may involve blowing or blow molding a liner (e.g., a plastic inner liner or bag) inside of an existing outer container or bottle. Such embodiments can essentially utilize all or a significant portion of the internal walls of an existing container or bottle as a mold for the blowing or blow molding of such liner. In some embodiments, low pressure air may be used to perform such blowing or blow molding of the liner within the container. Such methods may, among other things, reduce or eliminate the need for lubrication between a liner and a bottle and/or eliminate challenges of assembling and contemporaneously blow molding both a liner and a preform, in combination, into a resultant container with a liner therein.

Figure 1:
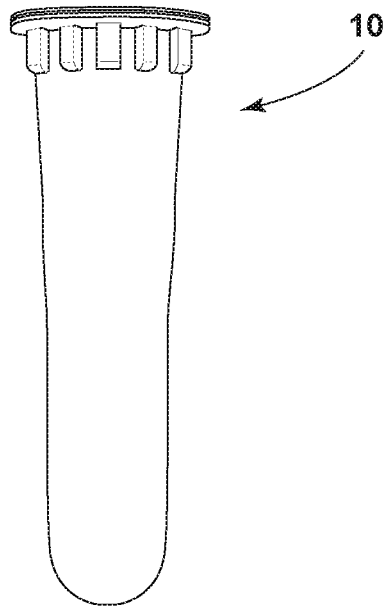
FIG. 1 generally illustrates an embodiment of an inner liner or bag in accordance with aspects or teachings of the present disclosure.

FIG. 1 generally illustrates an embodiment of an inner liner (which may also be referred to as a "bag") 10 in accordance with aspects or teachings of the present disclosure. With some embodiments, liners may be comprised of a various different polymer materials or compositions. In embodiments, the material associated with the inside of the liner or bag will be compatible for contact with intended contents. Moreover, embodiments of outer containers with inner liners may be suitable for applications or uses in which a given polymer (e.g., polyethylene terephthalate (PET)) associated with an outer container may not be compatible with intended container product contents.

Figure 2:
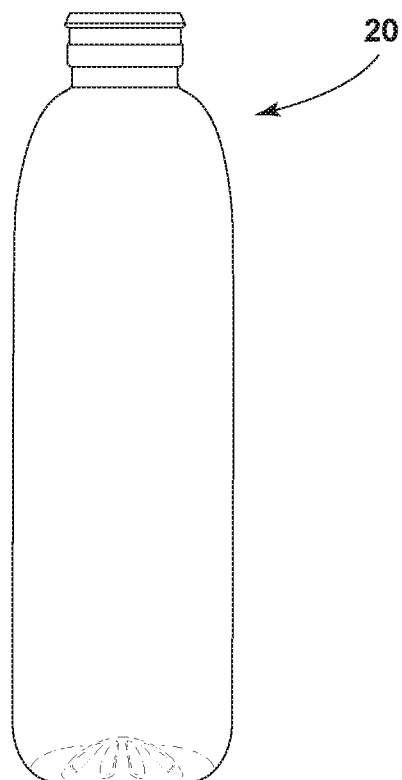
FIG. 2 generally illustrates an embodiment of an outer container in accordance with aspects or teachings of the present disclosure.

FIG. 2 generally illustrates an embodiment of an outer container 20 in accordance with aspects or teachings of the present disclosure. In embodiments, an outer container 20 may be comprised of a monolayer or multilayer polymer or plastic material, which polymer or plastic material may or may not include recycled content. With some embodiments, an outer container may include non-polymer or non-plastic material.

Figure 3:
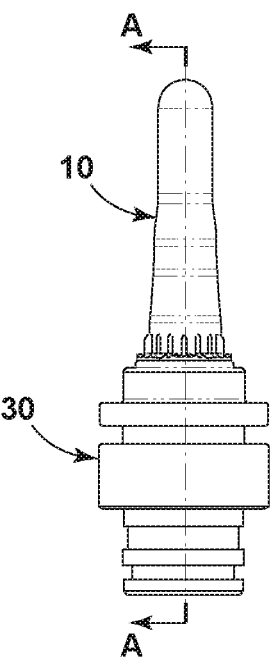
FIG. 3 generally illustrates a cross-sectional view of an embodiment of a liner on a blow nozzle in accordance with aspects or teachings of the present disclosure.
Figure 4:
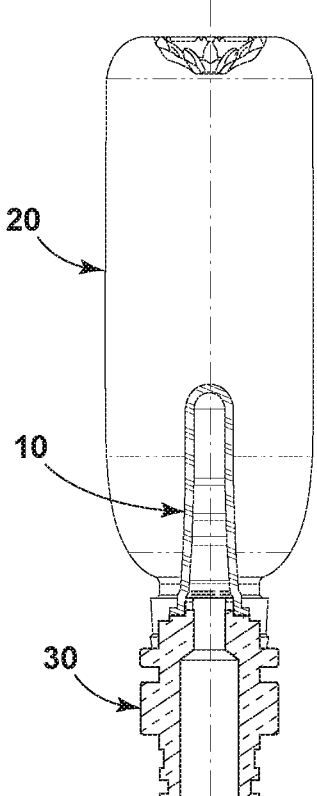
FIG. 4 generally illustrates an embodiment of a liner and an outer container on a blow nozzle prior to blowing.
Figure 5:
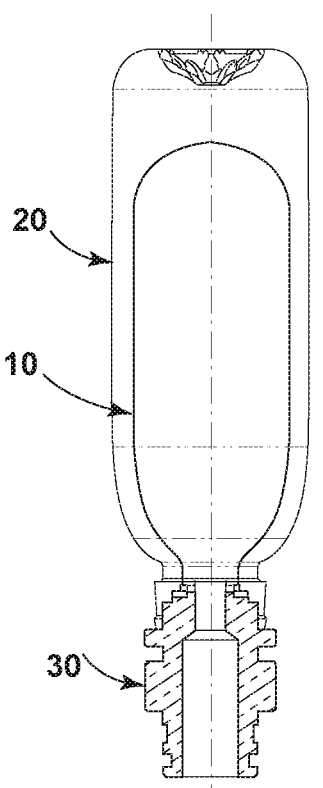
FIG. 5 generally illustrates an embodiment of a liner being blown and expanded within an outer container.

As generally illustrated in FIG. 3, in an embodiment, an inner liner 10 may be provided or otherwise disposed on or over a nozzle (e.g., blow nozzle 30). As generally illustrated in FIG. 4, an outer container 20 may be provided or otherwise disposed over and/or around an inner liner 10. In embodiments, an outer container 20 radially surrounds or substantially radially surrounds the inner liner 10. As generally illustrated in FIG. 5, an inner liner 10 may be expanded, e.g., during blowing, inside or within an outer container 20.

Figure 6:
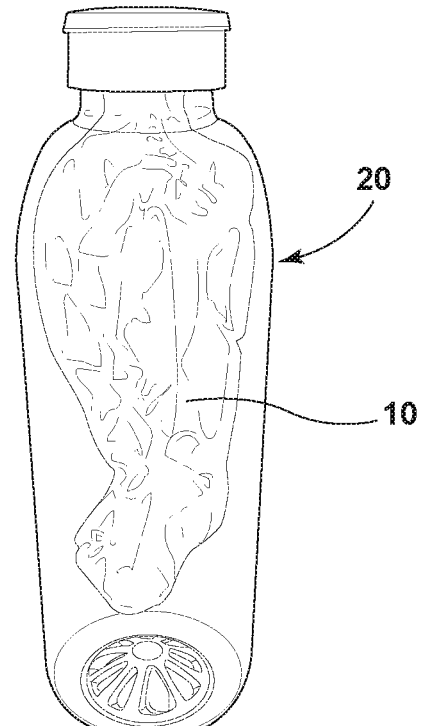
FIG. 6 generally illustrates an embodiment of a final formed liner or bag within an outer container.

FIG. 6 generally illustrates an embodiment of a formed inner liner (or bag) 10 within an outer container 20. In embodiments, a blown or formed inner liner 10 may fully or substantially follow the contours of the inner wall of the container 20. With some embodiments, particularly when contents are included, an inner liner may be in direct contact with the inner wall of the container 10. With embodiments, contents provided within the container 20 are separated from the wall of the container 20 by the inner liner 10.

Figure 7:
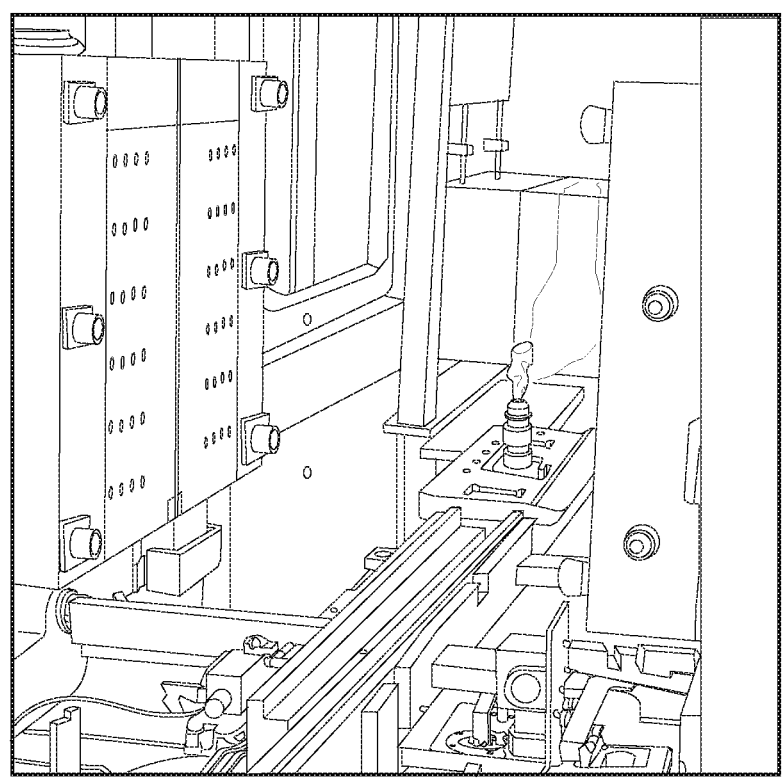
FIG. 7 generally illustrates an embodiment of a system with an inner liner or bag in accordance with aspects or teachings of the present disclosure.
Figure 8:
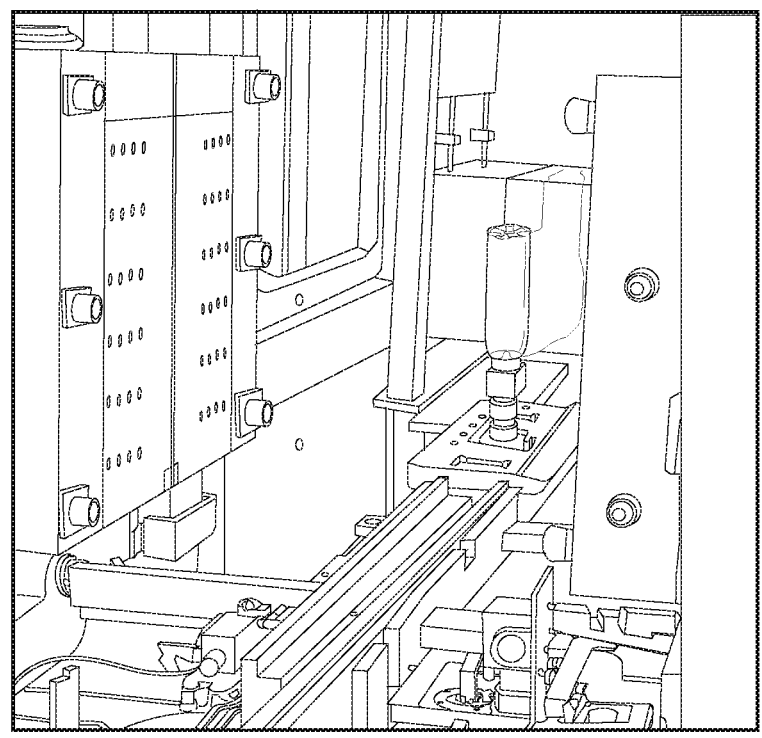
FIG. 8 generally illustrates an embodiment of a system with an outer container provided over an inner liner or bag.
Figure 9:
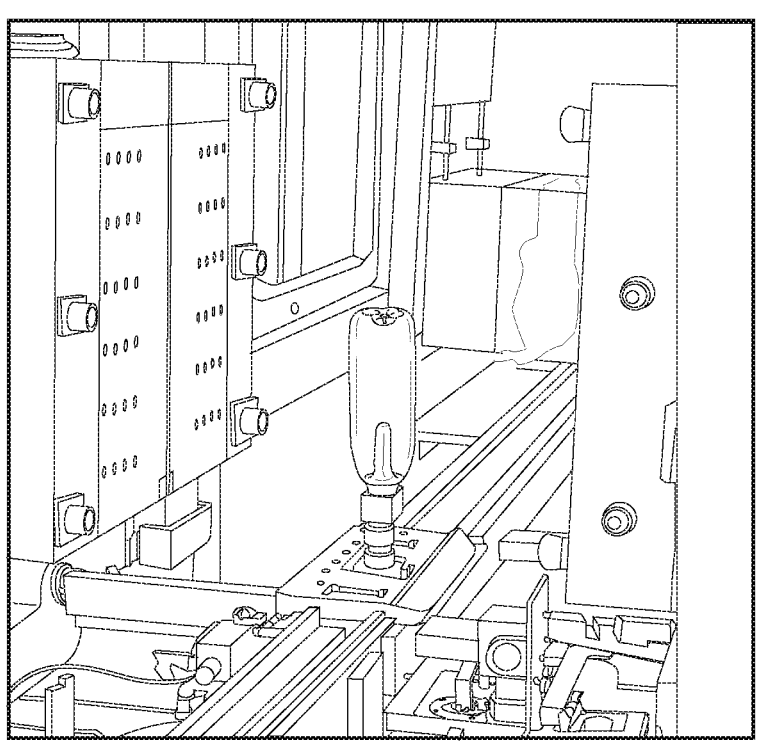
FIG. 9 generally illustrates an embodiment of a system with an inner liner or bag disposed in an outer container prior to further forming the inner liner or bag within the outer container.
Figure 10:
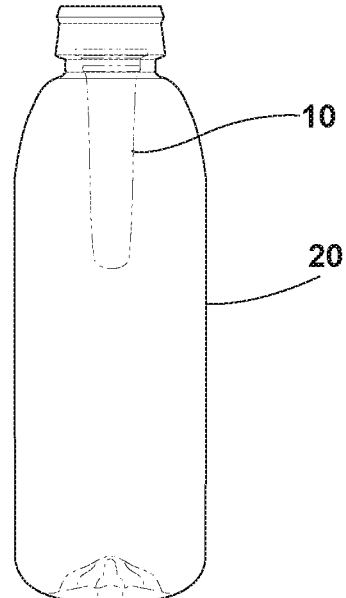
FIG. 10 generally illustrates an embodiment of an inner liner or bag disposed in an outer container prior to further forming the inner liner or bag within an outer container.

FIGS. 7, 8, 9, 11, and 12 generally illustrate an embodiment of a system in accordance with aspects or teachings of the present disclosure. As generally illustrated in FIG. 7, an inner liner or bag may be provided or disposed upon a component, e.g., a nozzle. FIGS. 8 and 9 generally illustrates a system with an outer container provided over an inner liner or bag, prior to further forming the inner liner or bag within the outer container. FIG. 10 generally illustrates an embodiment of an inner liner or bag disposed in an outer container prior to further forming the inner liner or bag within the outer container.

Figure 11:
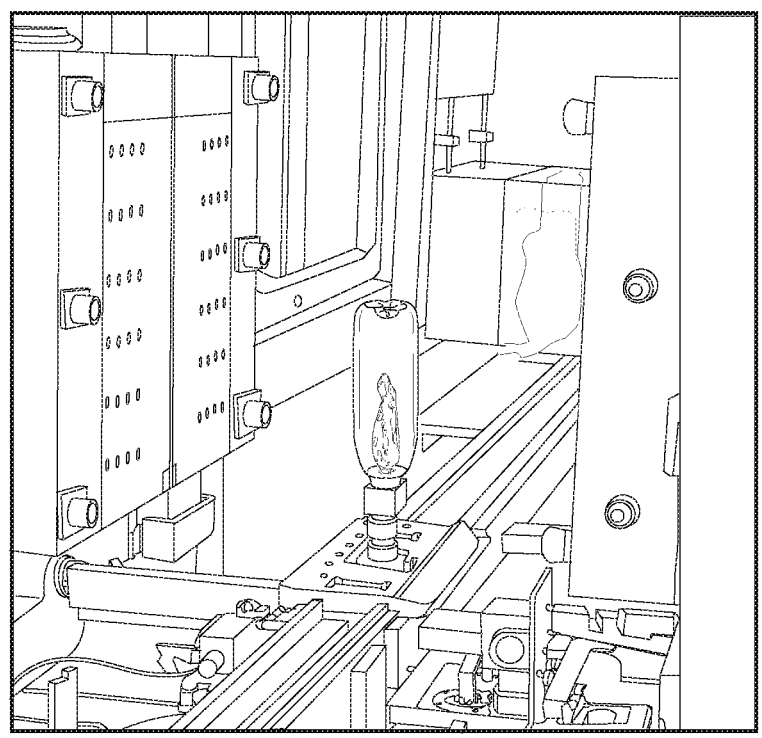
FIG. 11 generally illustrates an embodiment of a system with an introduction of a gas to form the inner liner or bag within an outer container.
Figure 12:
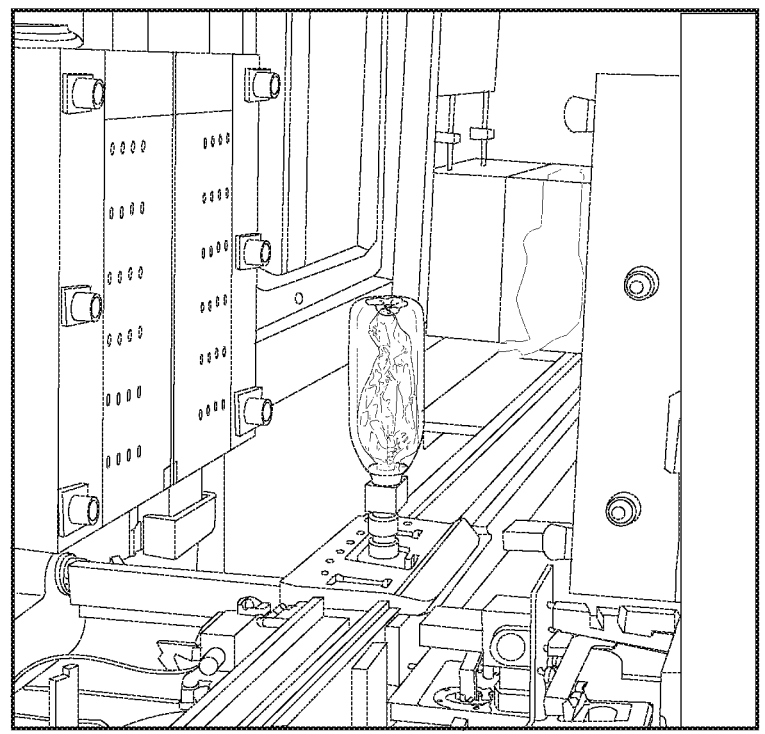
FIG. 12 generally illustrates an embodiment of a system with a formed inner liner or bag within an outer container.

FIG. 11 generally illustrates an embodiment of a system with an introduction of a gas to form the inner liner or bag within an outer container. FIG. 12 generally illustrates an embodiment of a system with a formed inner liner or bag within an outer container.

Embodiments of the disclosure may involve a process including:

(a) providing an outer container—such outer container may, for example, be formed from an injection molded preform, such as may be employed in connection with a two-stage, injection-stretch-blow-molding (ISBM) for forming a container;

(b) providing an inner liner or bag, which may be provided in the form of an inner molded preform (e.g., an injection molded preform);

(c) heating such inner liner or bag (such as an inner molded preform)—e.g., above its glass transition temperature ($T_g$)—this may be done, for example, via an infrared (IR) oven, although other methods for heating the inner molded preform may be used;

(d) disposing all or the majority of the heated inner molded liner or bag inside the outer container; and (e) introducing or injecting a gas into the heated inner liner or bag (e.g., inner molded preform) to cause the inner liner or bag (e.g., inner molded preform) to stretch and expand inside the outer container (e.g., to nearly the size of the internal volume of the outer container), such that portions of the inner walls of the outer container effectively serve as a mold or blow mold. With embodiments, the introduction or injection of gas into the heated inner liner or bag may be between about 1 bar to about 14 bar. With some embodiments, the introduction or injection of gas into the heated inner liner or bag may involve low pressure air (e.g., air with a pressure of less than 7 bar). In embodiments, when fully expanded, an inner liner may substantially conform to the contours of the inner wall of the outer container. The resulting article following such stretch and expansion of an inner liner or bag within an outer container may be referred to, inter alia, as a "bag in a bottle."

The foregoing process may avoid certain challenges or difficulties, such as those associated with heating a combined and assembled inner liner or bag and an outer preform. The present disclosure permits, if desired, separate heat treatment(s).

With an inner liner and outer preform combination, the inner liner and the outer preform do not blow (expand) at an identical rate. To provide for slippage between the components, a lubricant may sometimes be used to avoid tearing and/or sticking in connection with deflation of an inner liner in its useful life. Embodiments of the current disclosure may dispense with the need for a lubricant. Moreover, with the current disclosure, the introduction or insertion of a gas (e.g., air) into the outer container may, in part, serve as a buffer to help prevent the inner liner or bag from sticking to the inside of the outer container. Further, contrary to a preform and inner liner in assembled combination, the present disclosure would not include or require a stretch rod as part of the process of forming the inner liner or bag within an outer container.

In embodiments, an inner liner or bag may—prior to expansion—have a wall thickness over all or a majority of the wall structure of the inner liner or bag that is between about 0.5 mm and about 3.0 mm. Without limitation, in embodiments, such wall thickness may be about 1.65 mm. With embodiments, an inner liner may have a non-circular cross-section and may have varying wall thicknesses about the circumference of the inner liner. Further, with embodiments, an inner liner or bag may have a generally symmetrical appearance and/or an appearance that is aesthetically pleasing, such as when an inner liner or bag is filled with contents and/or as it collapses as product or contents are removed or evacuated.

Additionally, for some embodiments, the intrinsic viscosity (IV) associated with the inner liner or bag may be selected to provide monetary savings and/or easier processing. For example, the instant disclosure may permit a change in use from a resin that may typically have a 0.60 IV to one that may be a water resin, including water resins that may be considered to be common and/or standard for a water resin liner.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such elements. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While examples of dimensions of certain components may be described herein, such dimensions are provided as non-limiting examples and the components may have other dimensions.

While processes, systems, and methods may be described herein in connection with one or more steps in a particular sequence, it should be understood that such methods may be practiced with the steps in a different order, with certain steps performed simultaneously, with additional steps, and/ or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A method of forming a plastic container, comprising:
providing an inner liner comprised of a polymer;
providing a molded outer container comprised of a polymer;
disposing the inner liner within the outer container; and
expanding the inner liner within the outer container;
wherein portions of inner walls of the outer container serve as a mold; and the inner liner is expanded at a different rate than the outer container was previously expanded during molding.

2. The method of claim 1, wherein the inner liner is disposed on a nozzle prior to forming the inner liner.

3. The method of claim 1, wherein a gas forms the inner liner within the outer container.

4. The method of claim 1, wherein outer container is formed by blow molding a molded preform.

5. The method of claim 1, wherein the inner liner is provided as an inner molded preform.

6. The method of claim 1, including heating the inner liner above its glass transition temperature ($T_g$).

7. The method of claim 6, wherein the heating is via an infrared (IR) oven.

8. The method of claim 1, wherein the entire inner molded liner is disposed within the outer container prior to expanding the inner liner.

9. The method of claim 1, wherein the inner liner is heated, a gas is introduced to form the inner liner within the outer container, and a pressure exerted to form the inner liner is between about 1 and about 14 bar.

10. The method of claim 1, wherein the inner liner is heated, a gas is introduced to form the inner liner within the outer container, and a pressure exerted to form the inner liner is less than 7 bar.

11. The method of claim 1, including an introduction or insertion of a gas into the outer container as a buffer between the outer container and the inner liner.

12. The method of claim 1, wherein the outer container is provided over the inner liner.

* * * * *